United States Patent Office 3,489,665
Patented Jan. 13, 1970

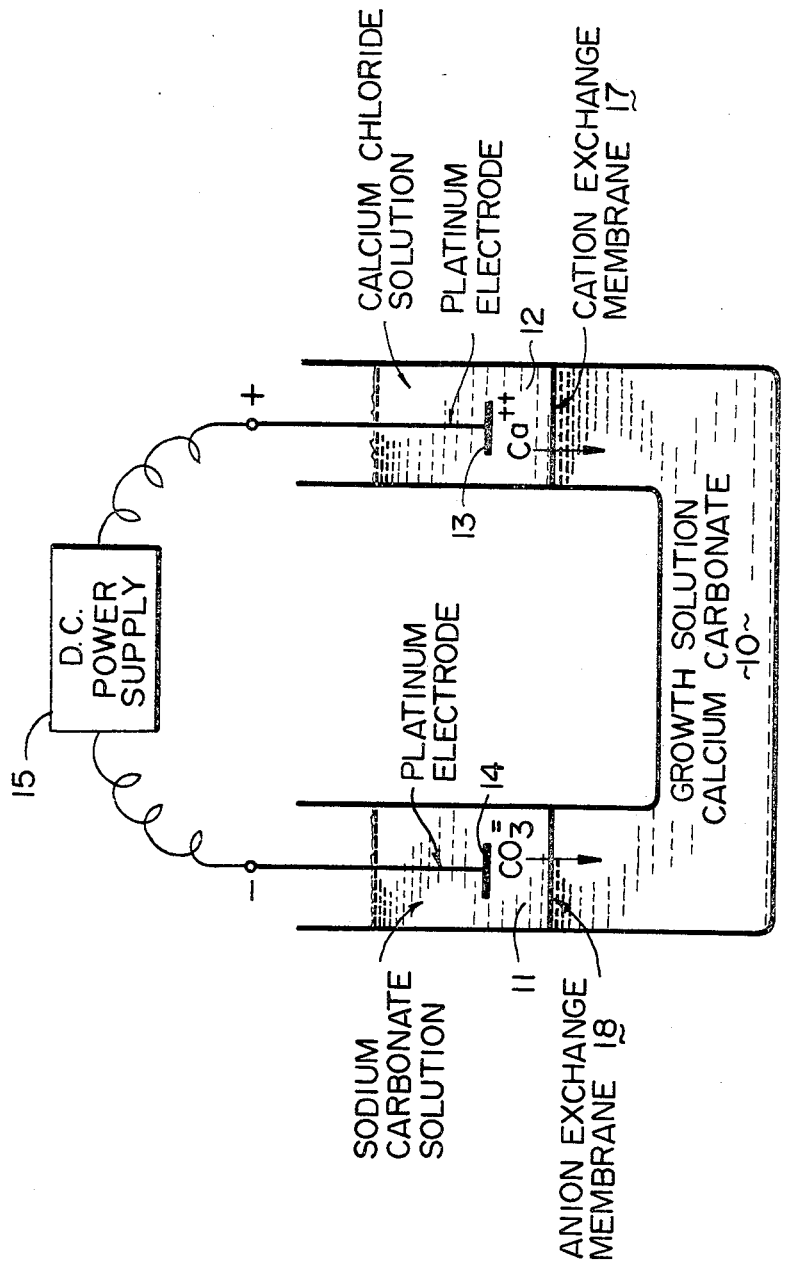

3,489,665
METHOD FOR GROWING CRYSTALS
Horace W. Chandler, New York, N.Y., assignor to Isomet Corporation, Palisades Park, N.J., a corporation of New Jersey
Filed Jan. 27, 1967, Ser. No. 612,190
Int. Cl. B01j 17/04; B01k 1/00
U.S. Cl. 204—180     2 Claims

ABSTRACT OF THE DISCLOSURE

A solution is divided into three component elements. One component element is a growth solution for a desired crystal. The growth solution is interposed between two ion source solutions which are separated from the growth solution by an anion exchange membrane in one case, and a cation exchange membrane in the other. An electrical circuit is provided, having its positive terminal in the cation exchange solution and its negative terminal in the anion exchange solution current flowing from the former to the latter via the growth solution. For example only, the cation source may be calcium chloride and the anion source sodium carbonate, if crystals of calcium carbonate, having the calcite crystal structure, are to be grown.

BACKGROUND OF THE INVENTION

Requirements exist in the optical and electronic industries for large single crystals. Several techniques are currently in use for production of large single crystals. (See "The Art and Science of Growing Crystals," J. J. Gilman, John Wiley & Sons, New York, 1965.) Although the present techniques have been found to have great utility under many conditions, there are limitations which have made it difficult or impossible to grow certain kinds of crystals. For instance, high temperature techniques are unsuitable for growing crystals having a solid-solid phase transformation at a temperature below that used in the growing process, since the phase transition resulting from cooling to room temperature introduces severe stresses and cracks in the crystal. Conventional solution growth techniques for growing crystals are inapplicable in many cases because of the great insolubility of the crystal in any solvent, thereby precluding the use of a programmed temperature technique or a controlled evaporation technique so often used with highly soluble materials. It is to overcome these limitations and also provide an alternative method for the growth of the more common, more soluble crystals from solution that the proposed technique is presented.

SUMMARY OF THE INVENTION

In general, the method of the invention involves the slow, controlled introduction of the ions (cations and anions) required to form the crystal, into a volume of solvent which is isolated from the respective salts which serve as the sources of cations and anions. The introduction of the ions is carried out at a rate small enough to prevent great super-saturation of the solution and thus prevent excessive nucleation of the solution. Such nucleation would result in the formation of many small crystals rather than the few large ones which are desired. The slow introduction of the ions is continued until the ionic concentration exceeds the solubility of the ionic crystal in the solvent, at which point crystals start to form in solution. Continued slow introduction of the ions results in continued growth of the crystals from the saturated solution. If a "seed" crystal is introduced into the initially saturated solution, the seed crystal can be caused to grow by this technique.

Isolation of solution in which growth is occurring from the two "nutrient" solutions which act as the source of the respective cations and anions is accomplished by means of permselective ion exchange membranes. These membranes are essentially ion exchange resins in membrane form which are permeable only to ions. If the ion exchange membrane is a cation exchange membrane it is permeable only to the flow of cations. If, on the other hand, the ion exchange membrane is an anion exchange membrane, it is permeable only to the flow of anions.

An anion exchange membrane is used to isolate the growth solution from the anion "nutrient" solution while a cation exchange membrane is used to isolate the growth solution from the cation "nutrient" solution. An electrode is placed in each of the two "nutrient" solutions and the electrodes are connected to a source of D.C. power. The electrode in the cation "nutrient" solution is connected to the positive (+) terminal of the power supply while the electrode in the anion "nutrient" solution is connected to the negative (—) terminal of the power supply. When a voltage is impressed across the two electrodes, a current flows through the three solutions, i.e., anion nutrient, growth solution, cation nutrient. The current is carried in solution by the motion of ions. The cations from the cation nutrient solution are attracted to the negative electrode in the anion nutrient solution. These cations can pass through the cation exchange membrane but not through the anion exchange membrane. The anions from the anion nutrient solution are attracted to the positive electrode in the cation nutrient solution. These anions can pass through the anion exchange membrane but not through the cation exchange membrane. The rate of introduction of these ions from the nutrient solutions into the growth solution is controlled by controlling the applied voltage, which in turn controls the flow of current through the solutions.

The net effect of this process is to introduce only the cation and anion required for the growth of the crystal into the growth solution thereby avoiding the introduction of impurity ions which might affect the growth rate or growth habit of the crystal.

BRIEF DESCRIPTION OF THE DRAWINGS

The single figure is a schematic representation of a source suitable for practicing the invention.

DESCRIPTION OF THE PREFERRED EMBODIMENT

The invention is disclosed as applied to growth of crystals of calcium carbonate having the calcite crystal structure. Large clear crystals of calcite are found only in nature and attempts to produce man-made crystals have been unsuccessful to date. In FIGURE 1, the apparatus was made of 1" diameter glass pipe sections clamped together with Teflon gaskets between sections to prevent intercompartment leakage. The growth solution compartment 10 is filled with a filtered, saturated aqueous solution of calcium carbonate. The cation nutrient solution compartment 11 contains a concentrated aqueous solution of calcium chloride while the anion nutrient solution compartment 12 contains a concentrated aqueous solution of sodium carbonate. Platinum screen electrodes 13 and 14 were immersed in each of the nutrient solutions and connected to a D.C. power supply 15 so that the electrode in the calcium chloride solution was connected to the positive (+) terminal of the power supply 15 while the electrode in the sodium carbonate solution was connected to the negative (—) terminal of the power supply 15.

A cation exchange membrane 17 (AMF ion C-60) was used to separate the growth solution from the calcium chloride solution while an anion exchange membrane 18 (AMF ion A-60) was used to separate the growth solution. The experiment was carried out at room temwas applied across the electrode sufficient to cause a current of about 0.3 milliamperes to flow through the solution. The experiment was carried out at room temperature with no attempt being made to control the solution temperature. The current was allowed to flow for about 96 hours. At the end of this period, the run was stopped and the crystals which had formed in the growth solution compartment were removed and examined. Microscopic examination showed well-formed crystals having the characteristic trigonal form of calcite. The crystals were about 0.2 mm. on a side and were found to dissolve in hydrochloric acid with the evolution of a gas. Comparison of the X-ray powder pattern obtained with a crushed sample of these crystals with the X-ray powder pattern obtained with a known sample of natural calcite showed that the crystals had the same structure as the naturally occurring calcite.

In contrast to this procedure, the product obtained by mixing solutions of calcium chloride and sodium carbonate to form a precipitate of calcium carbonate yields a product so fine-grained that no crystals can be discerned even with a microscope. The technique does, therefore, accomplish the goal of producing large, well-formed crystals and is capable of producing crystals of any desired size merely by extending the duration of the run.

Although the example cited refers to the growth of calcite crystals, the method is general and is applicable to the growth of a wide variety of crystals whose anion and cation components can be supplied by soluble compounds. Other examples: the growth of cuprous chloride crystals using cuprous sulfate and sodium chloride solutions as the cation and anion nutrient solutions, respectively; the growth of sodium nitrate crystals using sodium chloride and potassium nitrate solutions as the cation and anion nutrient solutions, respectively.

The essential features of the technique are the use of the anion and cation exchange membranes to isolate the anion and cation nutrient solutions from the growth solution and allow only the desired cation and anion to enter the growth solution and the use of an adjustable electric current flowing through the solutions to control the rate of flow of the anion and cation into the growth solution. Other variations or modifications of the process such as controlling the temperature of the solutions, operating at temperatures other than room temperature, stirring the solutions, introduction of a seed crystal into the growth solution, introduction of additives to the growth solution, changing the configuration or dimensions of the apparatus would all lie within the scope of the original idea. The invention is not, therefore, limited to the use of particular apparatus or to the growth of calcite crystals.

While I have described and illustrated one specific embodiment of my invention, it will be clear that variations of the details of construction which are specifically illustrated and described may be resorted to without departing from the true spirit and scope of the invention as defined in the appended claims.

I claim:

1. The method of growing crystals in a solution, including the steps of:
    slowly migrating anions under the influence of an electric field into said solution in one path and slowly migrating cations under the influence of said electric field into said solution in another path different from said one path,
    said anions and cations being combinable to grow said crystals in said solution, establishing the rate of anion and cation introduction at a sufficiently low level to enable growth of crystals and small enough to prevent great supersaturation of the solution and thus excessive nucleation of the solution.

2. The method according to claim 1, wherein a seed crystal is provided in said solution.

References Cited

UNITED STATES PATENTS 3,341,441  9/1967  Giuffrida et al. _____ 204—180

OTHER REFERENCES

Wilson, "Dimineralization by Electrodialysis," TD433, p. 7, C.2 (1960), pp. 40 and 41.

Mason et al., "Applications of Ion-Exchange Membranes in Electrodialysis," (1957), Chem. Engr. Progress, vol. 53, No. 12, December 1957, pp. 7, 8, 17 and 18.

JOHN H. MACK, Primary Examiner

A. C. PRESCOTT, Assistant Examiner

U.S. Cl. X.R.

204—86, 87